United States Patent

[11] 3,522,793

| [72] | Inventor: | Frederick W. Proewig<br>Wantagh, New York |
|---|---|---|
| [21] | Application No.: | 754,487 |
| [22] | Filed: | Aug. 21, 1968 |
| [45] | Patented: | Aug. 4, 1970 |
| [73] | Assignee: | Aquarium Import Corporation<br>Amityville, L.I., New York |

[54] CONDITIONED WATER HABITAT FOR SHIPPING AND KEEPING LIVE FISHES
12 Claims, No Drawings

[52] U.S. Cl. .................................................. 119/3,
424/250, 210/59
[51] Int. Cl. ...................................................... A01k 61/00
[50] Field of Search ........................................ 167/13;
424/339; 252/180; 210/54; 424/339; 210/54, 59,
42; 119/1, 3, 5

[56] References Cited
UNITED STATES PATENTS

| 2,728,725 | 12/1955 | Gloor ........................ | 210/54 |
|---|---|---|---|
| 3,306,256 | 2/1967 | Lewis ........................ | 119/3 |
| 3,311,535 | 3/1967 | Medford ................... | 167/53 |
| 3,446,733 | 5/1969 | Shell ......................... | 210/59 |

*Primary Examiner*— Aldrich F. Medbery
*Attorney*—Erich M. Radde, Charles A. Mc Clure, Gerard J. Weiser and Alfred Stapler ABSTRACT: Water used as a habitat for transporting, storing, and keeping live fishes is conditioned by the addition of substantially non-toxic, water-soluble cellulose derivatives and especially cellulose ethers such as methyl cellulose, sodium carboxymethyl cellulose, and others in amounts not substantially exceeding 5 g. per 100 liters.

U.S. PATENT 3,522,793
CONDITIONED WATER HABITAT FOR SHIPPING AND KEEPING LIVE FISHES

BACKGROUND OF THE INVENTION

(1) FIELD OF THE INVENTION

The present invention relates to a process for conditioning water and more particularly for conditioning water so as to improve its usefulness for storing, keeping, and transporting live fish and other aquatic animals, to compositions useful for such water conditioning, and to such conditioned water as it is used, for instance, in aquaria.

(2) DESCRIPTION OF THE PRIOR ART

It is known that transporting live fish and especially tropical fish collected in South America, Africa, and Asia for aquarists is rather difficult. Hundreds of thousands of tropical fishes die during transport. The average is 35% to 50% loss. The cause for this sudden death of fishes on transport is the formation of deep ulcers in their skin which are readily invaded by parasites, mostly fungi. The ulcers are the result of substances in the water which coagulate or otherwise remove the natural protective coating of the skin. Said coating is of mucoid nature and is responsible for the somewhat slimy feeling of all fishes.

Another reason for causing death of fishes on transport is the difference between water of the natural habitat of the fishes and the water used for transporting, storing, and keeping them. Tropical lakes and streams have a natural sedimentation which is surprisingly high. Up to six feet per year of sediment formation has been measured for tropical waters. This sediment consists mostly of cellulosic matter formed by plants and algae. It is partially decomposed by cellulose fermenting bacteria or fungi. Cellulose combines readily with substances dissolved in water and this factor, together with the high productivity of tropical rivers for plants and algae accounts for the fact that tropical waters, as far as they have been investigated by linologists, for instance, the Amazon river, streams in Sumatra, Java, and Thailand, have always been found to have water of almost chemical purity, i.e. a resistance of more than 50,000 Ohms. Such water corresponds almost to distilled water. The material which acts as de-ionizer in these tropical waters is the abundant cellulosic matter.

If fishes are removed from these natural environments and are transferred into shallow containers, the new environmental water has no buffering qualities as has natural water and, on the other hand, the increased carbon dioxide content of the crowded conditions in transport cans or tanks will cause metal ions derived from the metallic parts of the cans or tanks to be dissolved, for instance, in the form of carbonates. These metal ions act in a specific way as precipitants for mucous surfaces. This is common knowledge and use of this principle is made in therapy by applying Burow solution (aluminum acetate solution) to oozing surfaces or by using argyrol to treat nasal mucosa.

Metal ions most active in such manner are those of aluminum, iron, zinc, cobalt, and copper. But acidic anions also are aggressive and are able to coagulate the skin mucosa. Thus sulfates, phosphates, and silicic acid ions have also proved harmful. In aquaria sand (aluminum silicate) is split up by the carbon dioxide resulting from the metabolism of bacteria and fishes. When sufficient aluminum carbonate is present in the aquarium water, the skin surface of fishes is being precipitated, the fishes begin to "shimmy" and secondary infection with fungi or ichthyophthirius germs will promptly follow. Mass death is the result. In the tropics from where fishes are imported, it is the habit of the collectors to keep fishes in old oil-drums made of iron or steel until sufficient specimens have accumulated for shipment. Fishes in these drums with rust accumulation are already diseased when crated for airplane delivery to the importers in the Northern Hemisphere.

These fungoid diseases and ichthyophthirius ("ich" infections) are difficult to overcome. The addition of disinfectants to cans and tanks in which the fishes are transported from the tropics to the Northern Hemisphere is often not possible due to the different sensitivity of different species of fish to said disinfectants. And repeated changing of the water and/or removing the fishes from the infected cans and tanks can also not be carried out.

SUMMARY OF THE INVENTION

It is now one object of the present invention to provide a simple and effective process of conditioning water so that fishes can be transported, stored, and kept without any undue loss for a prolonged period of time.

Another object of the present invention is to provide a conditioning composition to be added to water especially to water used in transporting, storing, and keeping fishes and to prevent excessive death of the fishes on transport over long distances.

A further object of the present invention is to provide conditioned water which is especially useful in transporting fishes over long distances and in storing and keeping the fishes, for instance, in aquaria.

Other objects of the present invention and advantageous features thereof will become apparent as the description proceeds.

In principle, the process of conditioning water useful for transporting, storing, and keeping fishes comprises the addition thereto of cellulosic matter in soluble form. Especially useful have proved certain substantially non-toxic, water-soluble cellulose derivatives and preferably the water-soluble cellulose ethers such as methyl cellulose, ethyl cellulose, sodium carboxy methyl cellulose, hydroxy ethyl cellulose, mixed ethers of the type of methyl hydroxy ethyl cellulose and others. The preferred conditioning agent is carboxy methyl cellulose.

The amounts of water-soluble cellulose ethers added vary depending upon the use of the water conditioned therewith. In general addition of between about 0.2 g. and about 0.8 g. and preferably between 0.4 g. and 0.6 g. of the cellulose ether per 100 liters of water is sufficient to prevent and/or cure ulceration of the skin of fishes and especially of aquarium fishes. When adding the cellulose ether to containers, cans, or tanks used in the transport of fishes and especially of tropical fishes, whereby the fishes are kept under crowded conditions, amounts up to 5 g. per 100 liters and preferably amounts between about 2 g. and about 3 g. are added.

It was found that conditioning of water for transporting, storing, and keeping fishes with water-soluble cellulose ethers according to the present invention is economical since it is not necessary to add additional cellulose ether to the water before six weeks to two months have elapsed.

It may be mentioned that other water-soluble organic colloids such as gelatin, agar-agar, pectin, gum tragacanth are not suitable for water conditioning because they are decomposed quickly, render the water cloudy within 24 hours, cause lack of oxygen, and increase the carbon dioxide content of the water. As a result thereof the fishes are made uncomfortable and may die and are more readily attacked by bacteria, fungi, ichthyophthirius, and other microorganisms. Synthetic colloids such as vinylalcohol and the like are unsuitable because they are too "gluey" and do not combine with the dissolved anions and cations in the water and thus do not de-ionize the water and precipitate said ions as sediment.

Addition of water-soluble cellulose derivatives to the water in tanks in which tropical fishes were transported from South America to New York reduced the previous loss of 35% to 50% of fishes to losses not exceeding 3% per shipment. The process according to the present invention thus is of great value in all instances whereby fishes are kept alive in large numbers under crowded conditions.

DESCRIPTION OF THE PREFERRED EMBODIMENTS

The following examples serve to illustrate the present invention without, however, limiting the same thereto.

Example 1

0.5 g. of cellulose methyl ether (DS 1.6 to 2.0) are thoroughly wetted in 50 cc. of hot water. The dispersion is cooled, while stirring vigorously, to a temperature of 25-30° C. The resulting clear solution is stable at room temperature. 25 cc. thereof are added to 50 l. of water in an aquarium wherein viviparous fishes such as fifty guppies are kept. The danger of the fishes to become infected by "ich" is considerably reduced in comparison to fishes kept in an aquarium not conditioned by means of methyl cellulose.

Example 2

2 g. of sodium carboxy methyl cellulose (DS 0.7 - 0.8) are dissolved in 200 cc. of water. The resulting solution is added to 100 l. of water in a can used for transporting tropical fishes from South America to New York. While without the addition of sodium carboxy methyl cellulose about 30% to 50% of the fishes died even on air transport, these losses were reduced by the addition of said cellulose derivative to less than 3%.

Example 3

One to two tablets containing about 0.4 g. of methyl cellulose are added to the water of a 100 l. aquarium or to 20 l. of water used for transporting fishes from the tropics to Northern countries. The tablets dissolve in water of 25° C. within about two hours. Tests with the tablets have shown that the losses of the tropical fish known as "Cardinal Tetra" which comes from the upper Amazon river, are reduced from 90%, and even 100%, prior to the use of the tablets of example 3, to 3%.

In place of the methyl cellulose or sodium carboxy methyl cellulose of the degree of substitution (DS) mentioned in the preceding examples, there may be employed other types of methyl cellulose of a degree of substitution between 1.3 and 2.6 or of sodium carboxy methyl cellulose of a degree of substitution between 0.4 and 1.4. As stated above, other water-soluble cellulose derivatives may also be used as ethyl cellulose of a DS of 0.8 to 1.2 and others.

The amounts of cellulose derivative may also vary. It is readily possible to determine the required amount by preliminary tests whereby care is to be taken that the viscosity of the water is not substantially increased.

Of course, many changes and variations may be made in the water-soluble cellulose derivatives and their amounts added to water, in the manner in which the cellulose derivative is added to the water, whether in the form of an aqueous solution or in solid form, and the like may be made by those skilled in the art in accordance with the principles set forth therein and in the claims annexed hereto.

I claim:

1. In a process for conditioning a water habitat suitable for transporting, storing, and keeping fishes, the step which consists in adding to the water a substantially non-toxic water-soluble cellulose derivative in an amount not substantially increasing the viscosity of the water.

2. The process as claimed in claim 1, wherein the water-soluble cellulose derivative is methyl cellulose.

3. The process as claimed in claim 1, wherein the water soluble cellulose derivative is sodium carboxy methyl cellulose.

4. The process as claimed in claim 1, wherein amounts between about 0.2 g. and about 5.0 g. of the water-soluble cellulose derivative are added to 100 liters of water.

5. The process as claimed in claim 1, wherein amounts between about 0.2 g. and about 0.8 g. of the water-soluble cellulose derivative are added to 100 liters of aquarium water.

6. The process as claimed in claim 1, wherein amounts between 0.5 g. and about 5.0 g. of the water-soluble cellulose derivative are added to 100 liters of water used for shipping fishes over long distances.

7. A conditioned water habitat for transporting, storing, and keeping live fishes, comprising suitable fish habitat water containing a substantially non-toxic water-soluble cellulose derivative in an amount not substantially increasing the viscosity of the water.

8. Conditioned water as claimed in claim 7, wherein the water-soluble cellulose derivative is methyl cellulose.

9. Conditioned water as claimed in claim 7, wherein the water soluble cellulose derivative is sodium carboxy methyl cellulose.

10. Conditioned water as claimed in claim 7, wherein 100 l. of said conditioned water contain between about 0.2 g. and about 5.0 g. of the water-soluble cellulose derivative.

11. Conditioned water as claimed in claim 7, wherein 100 l. of said conditioned water contain between about 0.2 g. and about 0.8 g. of the water-soluble cellulose derivative.

12. Conditioned water as claimed in claim 7, wherein 100 l. of said conditioned water contain between about 0.5 g. and about 5.0 g. of the water-soluble cellulose derivative.